(12) United States Patent
Ruh

(10) Patent No.: US 6,429,970 B2
(45) Date of Patent: Aug. 6, 2002

(54) SUPPLEMENTARY APPLIANCE FOR TELESCOPIC SIGHTS

(75) Inventor: Rudiger Ruh, Munstertal (DE)

(73) Assignee: Sensopart Messtechnik GmbH, Freiburg (DE)

(*) Notice: Subject to any disclaimer, the term of this patent is extended or adjusted under 35 U.S.C. 154(b) by 0 days.

(21) Appl. No.: 09/756,536

(22) Filed: Jan. 8, 2001

(30) Foreign Application Priority Data

Jan. 8, 2000 (DE) .......................... 100 00 561
Jul. 10, 2000 (DE) .......................... 100 33 463

(51) Int. Cl.⁷ .................. G02B 23/00; G02B 27/34; G02B 27/36
(52) U.S. Cl. .................. 359/428; 359/399; 359/424; 362/23; 362/32
(58) Field of Search .................. 359/427, 428, 359/424, 399; 362/23, 32; 356/447, 251

(56) References Cited

U.S. PATENT DOCUMENTS

| 3,974,585 A |   | 8/1976 | Dunham | |
| 4,627,171 A |   | 12/1986 | Dudney | |
| 4,749,271 A | * | 6/1988 | Nagler | 359/407 |
| 5,339,227 A |   | 8/1994 | Jones | |
| 5,493,450 A | * | 2/1996 | Ekstrand | 359/799 |

FOREIGN PATENT DOCUMENTS

| DE | 199 13 461 A1 | 8/1993 |
| WO | WO 98/48237 | 10/1998 |

* cited by examiner

Primary Examiner—Jon Henry
(74) Attorney, Agent, or Firm—Horst M. Kasper

(57) ABSTRACT

The invention proposes a supplementary appliance (3) in order to produce an illuminated reticle (5) for telescopic sights (1), which can be fitted as required to different telescopic sights (1), to be precise to their objective end (2), and allows the user to aim at his target reliably even in twilight or moonlight. An inner ring (12) is mounted such that it can be adjusted centrally in an annular cage (9) which can be pushed onto the objective side (2) of a telescopic sight (1), and the light from a point light source (19) is directed onto a lens (20) which is held on the center axis of the inner ring (12). The diameter of the light beam which emerges from the light source is limited by optical means (21, 29) at the object-side focal point of the lens (20), and the light beams which leave the lens (20) are directed onto the aiming point (7) in the reticle (5) or crosswires (6) of the telescopic sight (1).

25 Claims, 9 Drawing Sheets

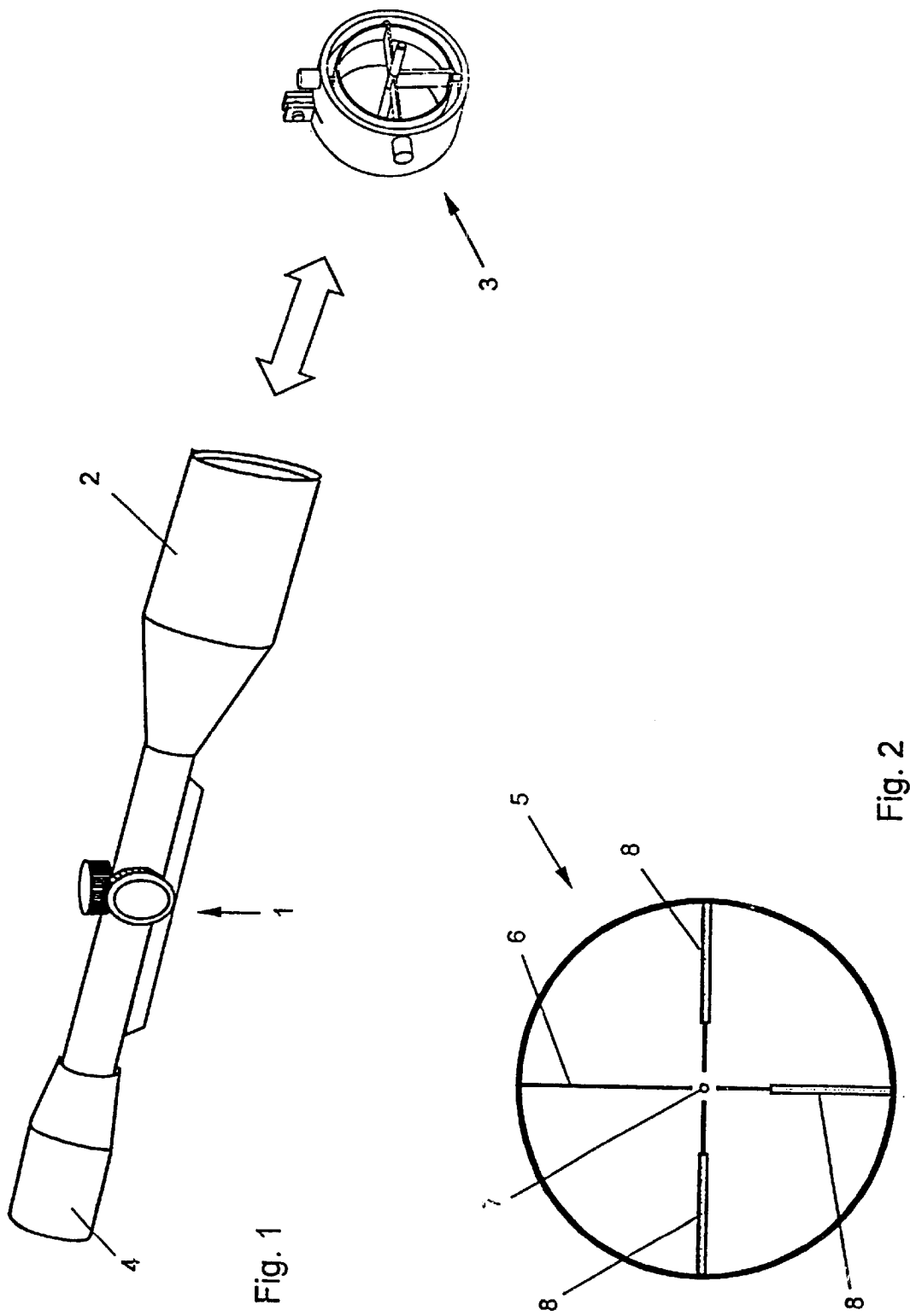

Figure 3:
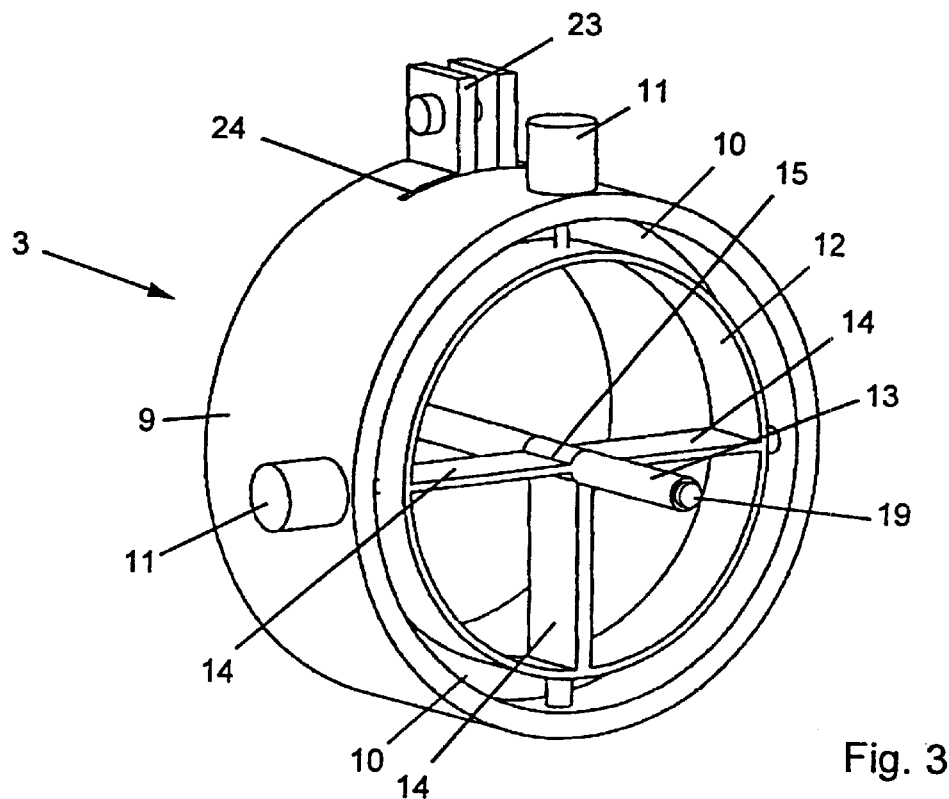

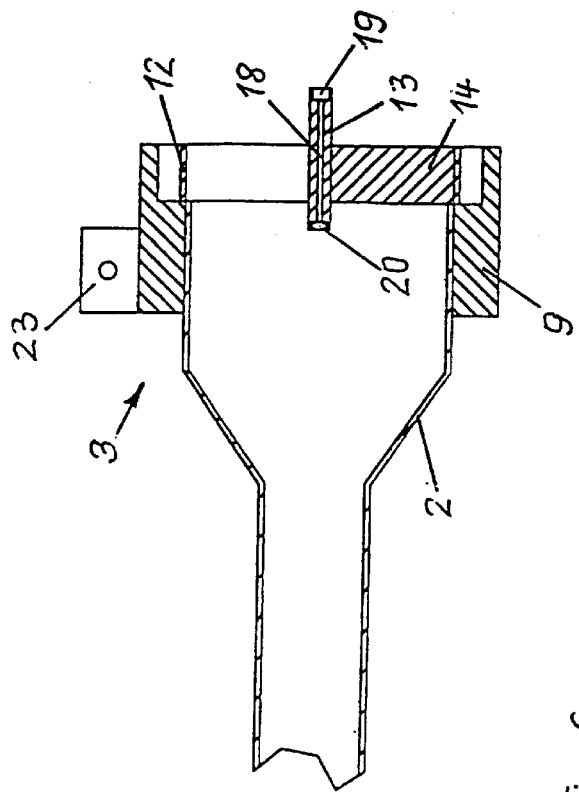
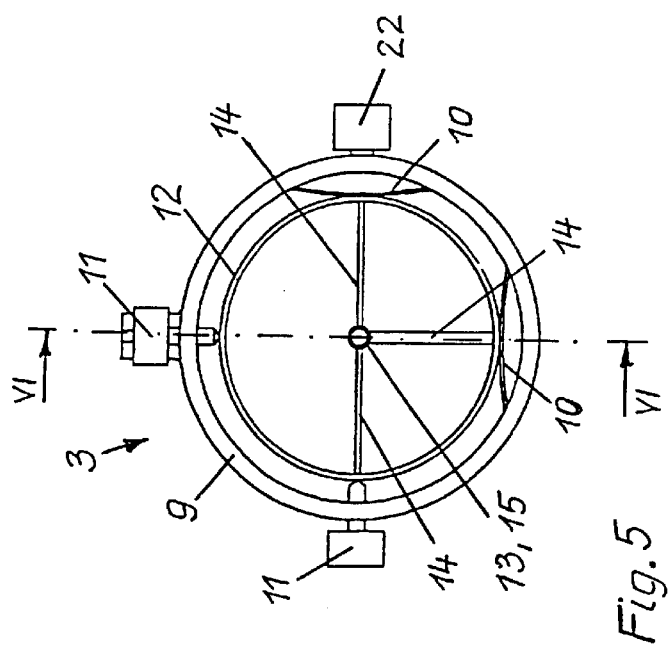
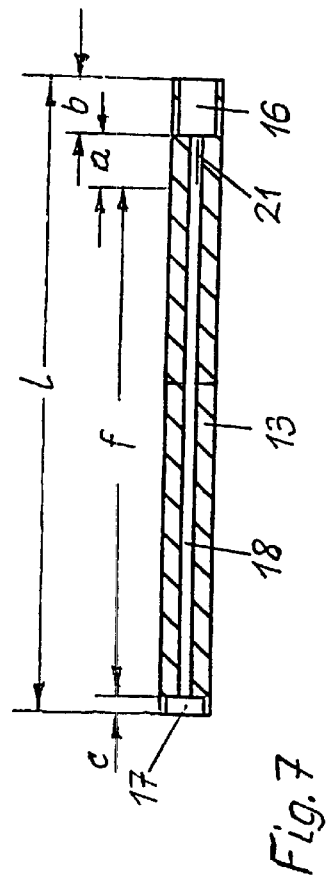

SUPPLEMENTARY APPLIANCE FOR TELESCOPIC SIGHTS

The invention relates to a supplementary appliance for producing an illuminated reticle for telescopic sights.

Illuminated reticles which are integrated in telescopic sights are known. They are, of course, linked to a specific telescopic sight, that is to say they cannot be used variably, and, together with the telescopic sight, they are relatively expensive.

Hunters have a need for a low-cost supplementary appliance for producing an illuminated reticle in low-light telescopic sights, for hunting in twilight and when the moon is full, when even a low-light telescopic sight no longer allows accurate aiming at a dark target.

A supplementary appliance which, when required, can be pushed onto the ocular area, facing the person firing the weapon, of a telescopic sight is proposed on page 38, right-hand column of Issue No. 9, December 1999 of the journal "Der Jäger in Baden-Württemberg" [The hunter in Baden-Württemberg]. The light from a light-emitting diode is emitted as a point source in the direction of the reticle in a supporting element which leads from underneath to the center of the reticle. The crosswires in the reticle have three bars which point from the outer edge to the aiming line, that is to say to the center point or aiming point of the crosswires. If these bars are provided with a fluorescent coating, then they start to glow under the influence of the light emitted from the light-emitting diode. According to one variant, only the upper region of the aiming post glows and, like the bars which have been mentioned, this ends at a distance from the center point or aiming point of the crosswires, that is to say it also only points toward it. The light source can be switched on and off by means of a rotary switch on the appliance, and the light flux can also be regulated appropriately by the telescopic sight type.

However, this appliance still has a number of disadvantages.

Since the appliance is pushed onto the ocular area of the telescopic sight, facing the person firing the weapon, the distance to the eye is reduced in a corresponding manner, while the risk of the recoil causing injuries to the eye is increased at the same time.

It is suitable only for telescopic sights whose reticle is equipped with the fluorescent bars, which is not true of all sights.

The light from the light-emitting diode shines from the rear into the telescopic sight and illuminates the reticle completely, so that this results in insufficient contrast for the eye of the person firing the weapon.

The actual aiming point in the crosswires is not illuminated and, in fact, this must be averaged, that is to say estimated, on the basis of the fluorescent bars.

Recently, illuminated reticles have appeared for daytime, but in this case the light spot which is produced must be brighter. A stronger light source, that is to say, for example, a more powerful light-emitting diode, a large-diameter optical fiber and a lens with an appropriately adapted focal length are then required.

The object of the invention is to provide a low-cost supplementary appliance for telescopic sights for hunting in twilight and in moonlight, which does not change the distance to the eye and which produces a light point which is as sharp as possible as accurately as possible at the aiming point in the reticle, and thus also offers good contrast to the eye of the person firing the weapon. It is intended to be possible to use the appliance as required with different telescopic sights, and it must be possible to fit it to the telescopic sight, and remove it again, with a few, simple actions.

This is achieved according to the invention in that an inner ring is mounted such that it can be adjusted centrally in an annular cage which can be pushed onto the objective side of a telescopic sight, and the light from a point light source is directed onto a lens which is held on the center axis of the inner ring, with the diameter of the light beam which emerges from the light source being limited by optical means at the object-side focal point of the lens, and with the light beams which leave the lens being directed onto the aiming point in the reticle or crosswires of the telescopic sight.

Since, as an external illuminated reticle, the supplementary appliance is pushed onto the objective end of the telescopic sight, the distance to the eye does not change when it is used. The lens results in a small, sharp light spot being produced in the reticle, to be precise directly at the aiming point, whose size and intensity are equivalent to that of a conventional illuminated reticle integrated in the telescopic sight, and which thus allows the person firing the weapon to aim even in twilight or when the moon is full. Since the appliance can be fitted to the telescopic sight, and can be removed again, as required, it can also be used together with a number of different telescopic sights. It can be fitted as a supplementary device to all telescopic sights on the market, irrespective of their magnification or objective diameter.

It is preferable for the light source to be a red light-emitting diode, and the optical means which limits the diameter of the light beam which originates from the light source may be an optical fiber which projects from this light source and projects as far as the object-side focal point of the lens, or may be an aperture which is arranged at the object-side focal point of the lens. The outlet opening on the optical fiber or the aperture opening is thus imaged as a sharp, tightly limited light spot in the reticle of the telescopic sight.

The lens is preferably a convergent or collimator lens, and the light beams which originate from its focal point and arrive at it as divergent beams leave it as parallel light beams. The supplementary appliance can thus be used on telescopic sights with different distances between the outlet pupil of the appliance and the crosswires, and with different magnifications. It is thus not linked to appliances from a specific manufacturer or of a specific type.

If the lens is a convergent lens whose image-side focal point is located at the aiming point in the reticle or crosswires of the telescopic sight, the appliance is optimally suitable for use on telescopic sights with a specific focal length, and the image of the light spot is then particularly sharp and tightly limited.

Since the diameter of the divergent light beam arriving at the lens is once again limited by a further aperture arranged in front of the lens, this avoids disturbing reflections at the edge of the lens.

According to one preferred embodiment of the invention, a bush is held on the center axis of the inner ring by one or more thin struts which originate from the inner circumference of the inner ring; at its end facing away from the objective of the telescopic sight, this bush has a recess for accommodating the light source and, at its other end, has a recess for accommodating the lens, with the two recesses being connected to one another by a central passage.

Within the bush, an aperture which has an opening with a desired diameter of approximately 9 μm is then arranged at the object-side focal point of the lens.

If the light beams are limited by an optical fiber which projects from the light source, then this optical fiber projects into the passage in the bush, as far as the object-side focal point of the lens. Its outlet opening is intended to have a preferred diameter of approximately 9 µm. The overall length of the bush is then equal to the sum of the focal length f of the lens plus the length a of the optical fiber plus the depths b, c of the two respective recesses for accommodating the light source and the lens.

According to another embodiment of the invention, the light source is fitted to the side of the cage, and its light is carried by an optical fiber (glass fiber) to the object-side focal point of the lens which is held by struts which originate from the inner circumference of the inner ring.

The struts which originate from the inner circumference of the inner ring can end in a sleeve which is located on the center axis of the inner ring and in which the lens is held or into which the bush is pushed.

According to one embodiment, the lens or the bush is held by three struts which originate from the inner circumference of the inner ring and are held separated from one another by an angle of 90° or 180°.

According to another embodiment, the lens or the bush is held by three struts which originate from the inner circumference of the inner ring and are held separated from one another by an angle of 120°.

According to a further advantageous embodiment, the lens or the bush is held by a single strut which originates from the inner circumference of the inner ring and ends in a sleeve on its center axis. This results in the light throughput being further improved.

The electrical supply lines for the light source are preferably carried out through one of the struts. To this end, one of the struts can be designed to be thicker and may have a longitudinal groove for accommodating the electrical supply lines for the light source.

According to one embodiment of the invention, the inner ring is mounted in the cage by means of leaf springs which are supported on the inner circumference of the cage and on the outer circumference of the inner ring, and its position can be adjusted by means of adjustment screws which pass through the wall of the cage.

According to another embodiment of the invention, the inner ring is mounted in the cage by means of helical springs which are supported at one end on a step in the inner wall of the cage and at the other end in holes which are provided for this purpose in the inner ring, and the inner ring can be tilted by means of adjusting screws which can be adjusted in the holes from the outside.

There is thus no need for any calibration firing when using the supplementary appliance according to the invention, and the light spot just needs to be made to coincide with the reticle, which can easily be done by adjusting the inner ring by means of the adjustment screws or adjusting screws.

The cage has a clamping apparatus by means of which it can be fixed firmly, such that it cannot slide, on the objective side of the telescopic sight by means of a manually operated screw, therefore without the assistance of any tools, and can be loosened again in order to remove the telescopic sight.

The light source can be switched on and off by means of a switch arranged on the side of the cage; this may be, for example, a toggle switch, a rotary switch or a push-button switch.

It is particularly advantageous if a combined switch is arranged on the side of the cage, which not only allows the light source to be switched on and off but also allows its light intensity to be varied as required.

Figure 4:
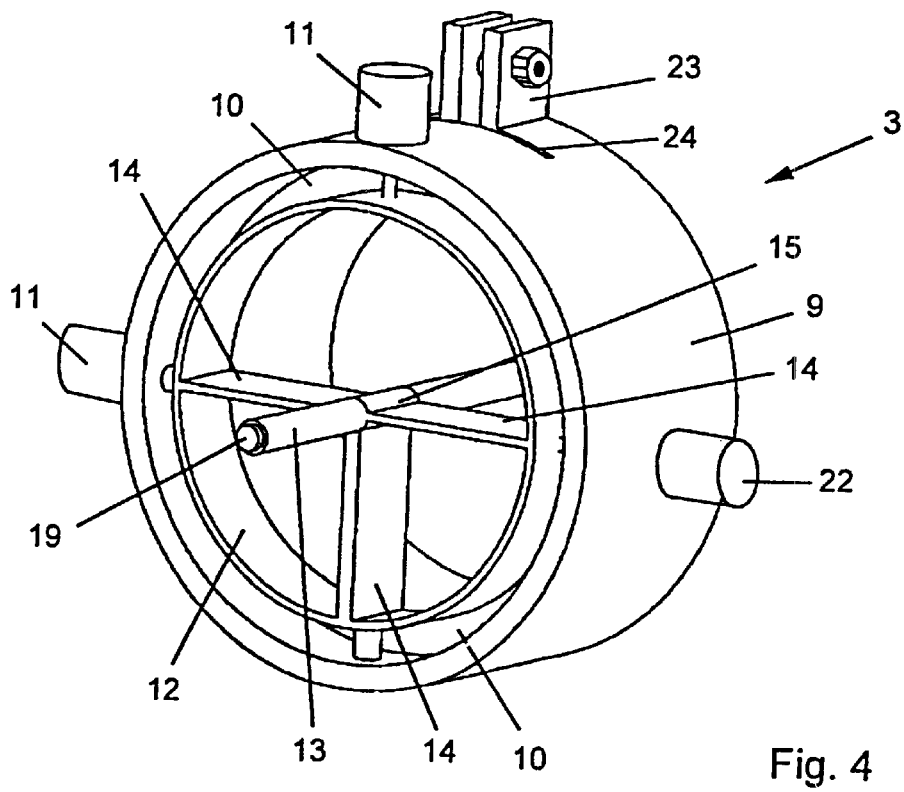
Figure 8:
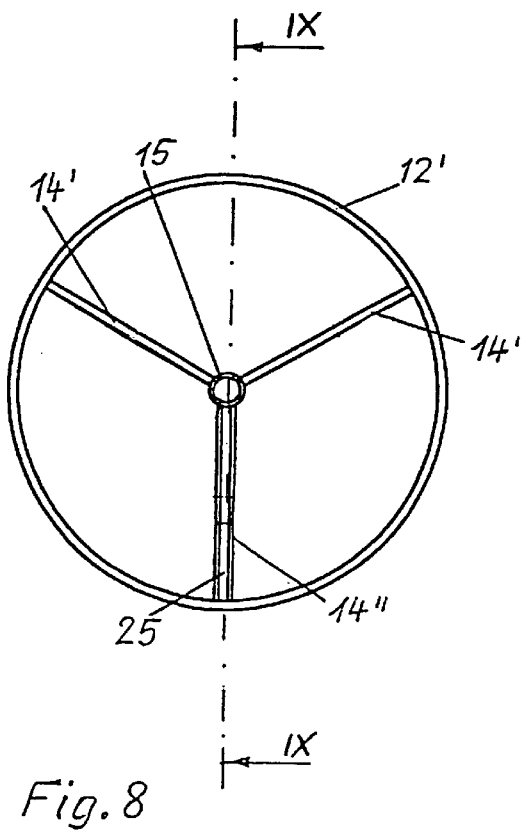
Figure 9:
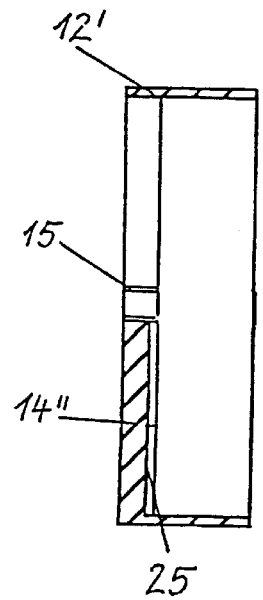
Figure 10:
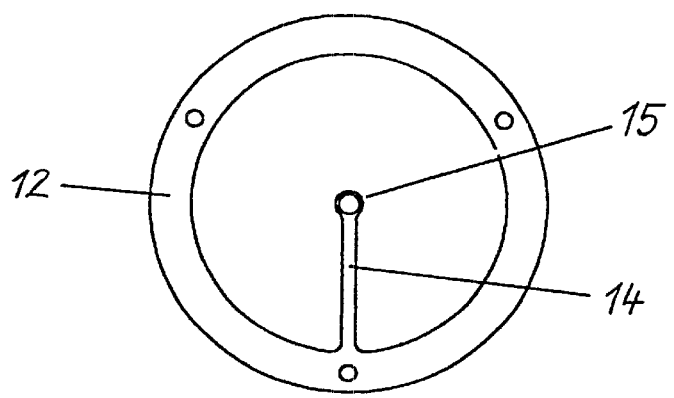
Figure 11:
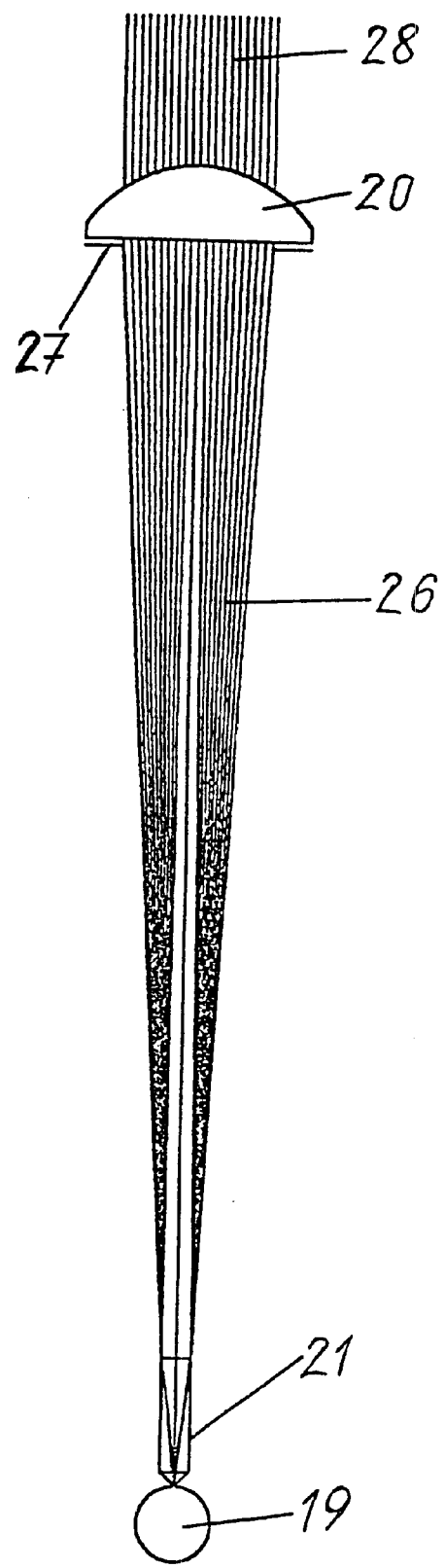
Figure 12:
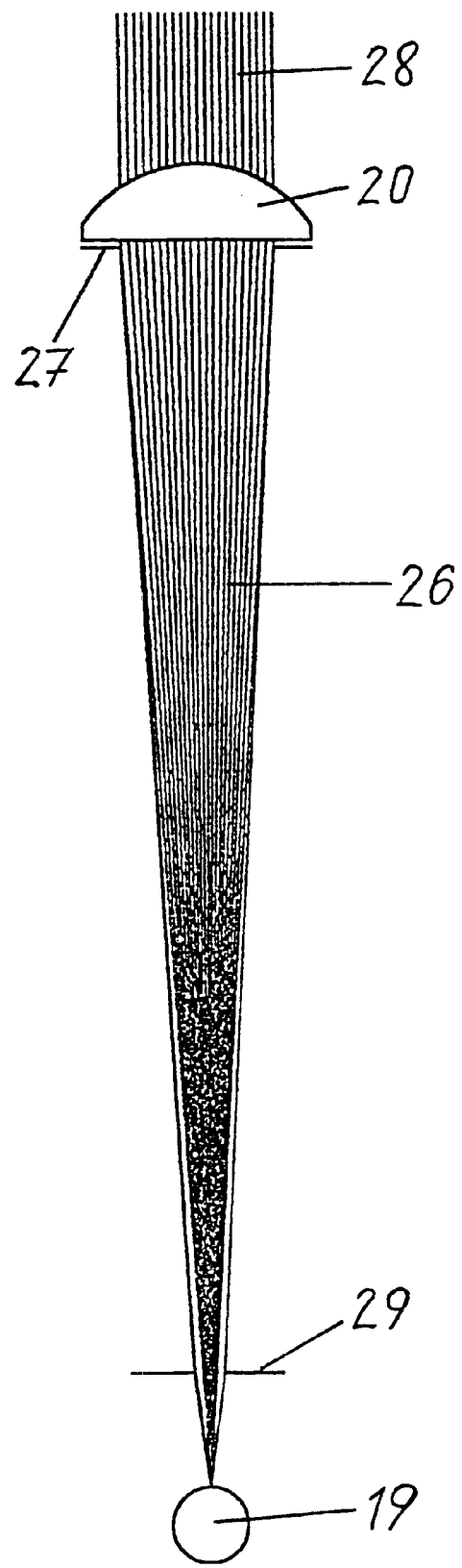
Figure 13:
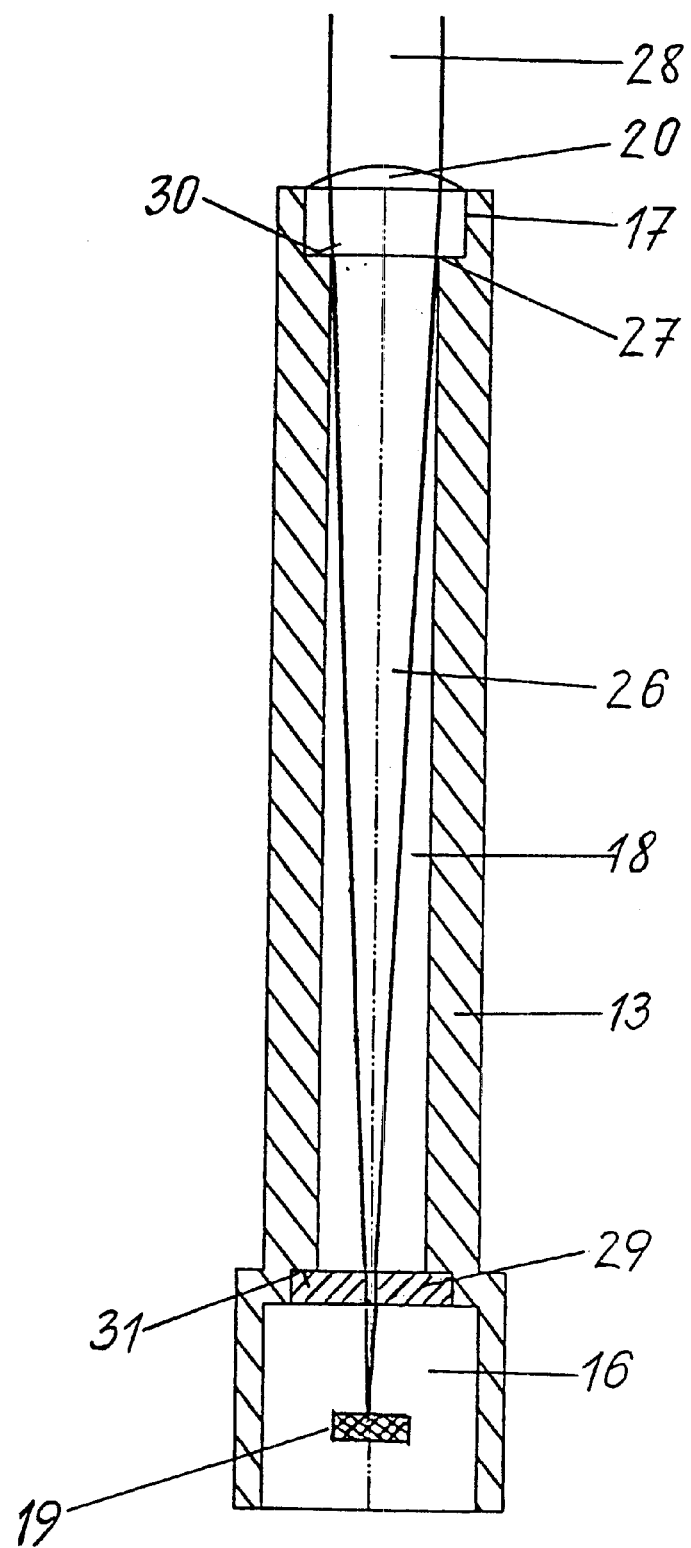
Figure 14:
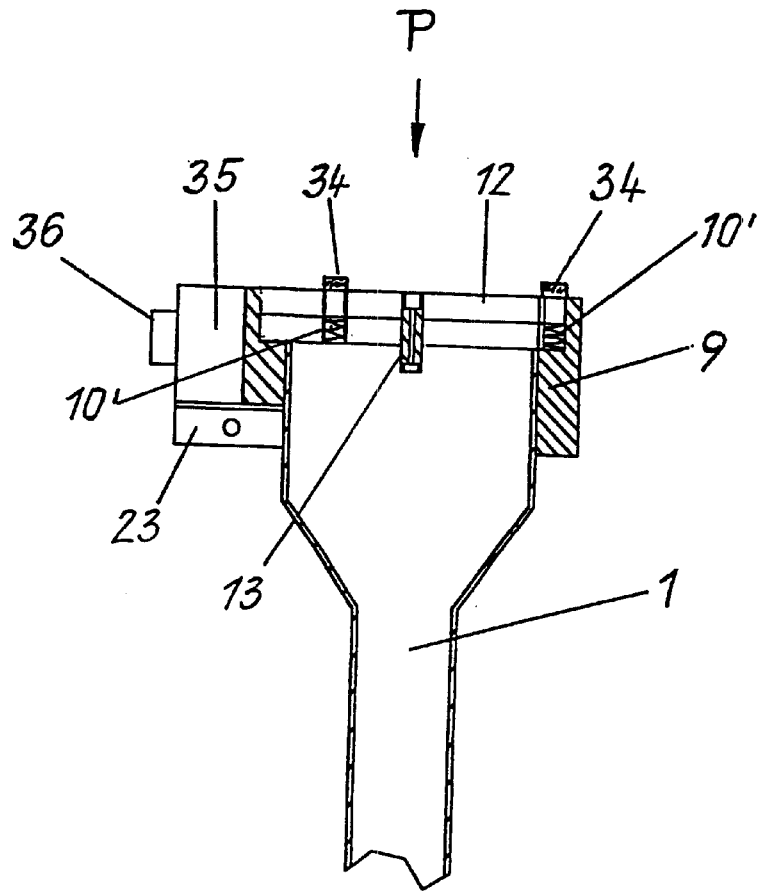
Figure 15:
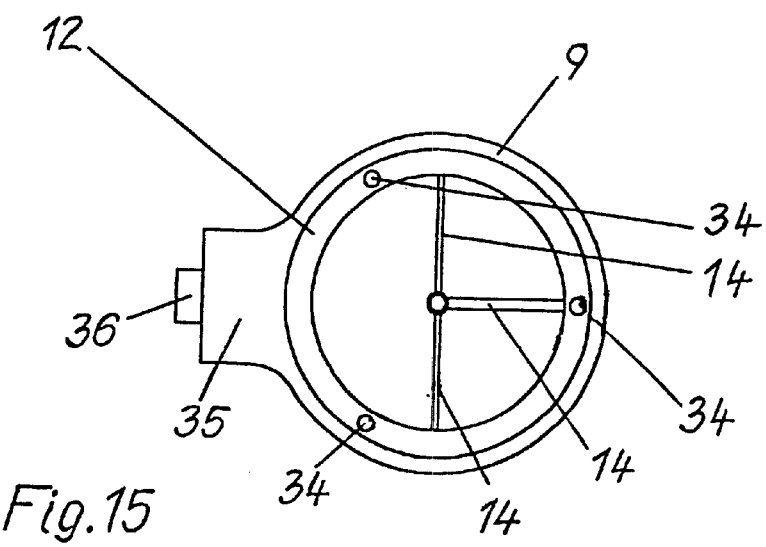
Figure 16:
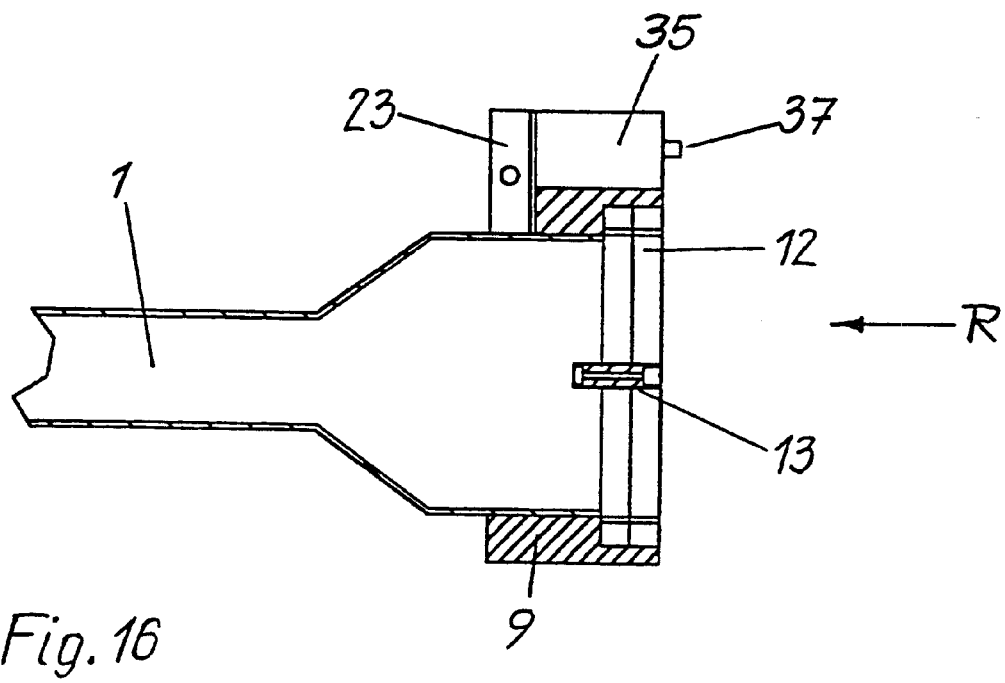
Figure 17:
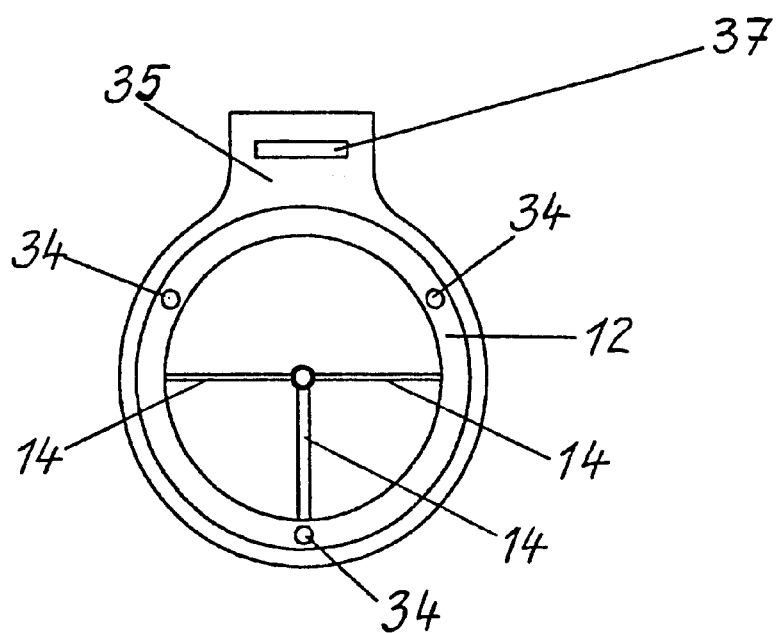

The invention will be described in more detail in the following text using the attached drawing by way of example, in which:

FIG. 1 shows a telescopic sight and, separately from it, a supplementary appliance according to the invention, FIG. 2 shows the reticle which can be seen through the ocular of a telescopic sight, FIG. 3 shows a perspective view of a first embodiment of the supplementary appliance according to the invention, from a first viewing angle, FIG. 4 shows a perspective view of the supplementary appliance as shown in FIG. 3, from a second viewing angle, FIG. 5 shows the front view of the supplementary appliance as shown in FIGS. 3 and 4, FIG. 6 shows, schematically, a longitudinal section through the objective end of a telescopic sight with a first embodiment of the supplementary appliance fitted, FIG. 7 shows an enlarged longitudinal section through the bush, which is held in the center of the supplementary appliance, as shown in FIG. 6, FIG. 8 shows the front view of a variant of the inner ring of a supplementary appliance according to the invention, FIG. 9 shows a section through the inner ring, along the section line IX—IX in FIG. 8, FIG. 10 shows the front view of a further variant of the inner ring of a supplementary appliance according to the invention, FIG. 11 shows, schematically, the beam path between a light-emitting diode and a convergent lens as an essential component of one embodiment of the invention, FIG. 12 shows, schematically, the beam path between the light-emitting diode and the convergent lens of another embodiment of the invention, FIG. 13 shows a longitudinal section through an arrangement which implements the embodiment as shown in FIG. 12, FIG. 14 shows a schematic longitudinal section, as shown in FIG. 6, through another embodiment of the supplementary appliance according to the invention, FIG. 15 shows the view of the supplementary appliance as shown in FIG. 14, in the direction of the arrow P in FIG. 14, FIG. 16 uses a schematic longitudinal section through the supplementary appliance according to the invention to show a variant of the operating switch for the appliance electronics, and FIG. 17 shows the view of the supplementary appliance as shown in FIG. 16, in the direction of the arrow R in FIG. 16.

FIG. 1 shows, schematically, a telescopic sight 1 onto whose objective end 2 a supplementary appliance 3 according to the invention can be fitted, and can be removed again, as required. FIG. 2 shows the reticle 5, which can be seen through the ocular 4 of the telescopic sight 1, with the crosswires 6, which can be etched, in a known manner in the form of thin lines, into a glass plate, and the aiming point 7 in the center of the crosswires 6. The crosswires 6 and the reticle 5 are normally located in the object-side focal plane of the ocular 4 or in the image focal plane of the objective. Bars 8, which originate from the edge and end considerably before the aiming point 7, are provided on three of the lines of the crosswires 6 pointing toward the aiming point 7.

FIGS. 3, 4 and 5 show perspective views of a first embodiment of the supplementary appliance 3 from two different viewing angles and as a front view. This comprises an annular cage 9 in which an inner ring 12 is mounted (see also FIG. 6), supported by springs 10 and whose position can be adjusted by means of adjustment screws 11. In this embodiment, the springs 10 are in the form of leaf springs.

An elongated bush 13, extending in the axial direction, is held in the center of the inner ring 12 by means of three struts 14 which originate from the inner circumference of the inner ring 12 and are at angles of 90° or 180° to one another, for which purpose these struts are in the form of sleeves at their ends that meet one another. The bush 13 is inserted in this sleeve 15. As can be seen from FIG. 6, and even more clearly from FIG. 7, the bush 13 has a concentric recess 16, 17 at both its front end and at its rear end, which recesses are connected to one another through a central passage 18. A preferably red light-emitting diode 19 is inserted into the recess 16 at that end of the bush 13 which points forward from the supplementary appliance 3, while a microlens 20 is fitted into the recess 17 at the other, inner end, and is preferably a convergent lens. An optical fiber 21 which is no thicker than a hair projects from the light-emitting diode 19 into the passage 18 as far as the object-side focal point of the convergent lens 20.

According to one proposal of the invention, this convergent lens 20 focuses the beam of light from the light-emitting diode 19, which originates at the end of the optical fiber 21 and which arrives at it through the passage 18, onto its image-side focal point, where it produces a very small, sharp point of light, which then comes to rest at the aiming point 7 of the reticle 5 of a telescopic sight 1 equipped with this supplementary appliance, and thus illuminates this aiming point 7 exactly. However, according to this proposal, the position of the point of light at the aiming point 7 of the reticle 5 is achieved in an ideal manner only if the image-side focal point of the convergent lens 20 lies in the object-side focal plane of the ocular 4 of the telescopic sight 1, in which the reticle 5 is normally also located. This means that such a supplementary appliance can be used optimally only in conjunction with telescopic sights 1 with a specific focal length, and its usefulness is thus limited.

In order actually to make the supplementary appliance usable universally, that is to say in conjunction with different telescopic sights 1, including those with different focal lengths, then, according to a further proposal of the invention, the light beams which originate from the light-emitting diode 19 and, as described, are focused by the optical fiber 21 at the object-side focal point of the convergent lens 20 are not focused by the convergent lens 20, but are collimated or made parallel. This means that the light-emitting diode 19 and the optical fiber 21 together form an approximately point light source at the object-side focal point of the convergent lens 20, and the divergent light beams, which arrive at the convergent lens 20, leave the convergent lens 20 (or collimator lens 20) as parallel light beams. These then arrive at the reticle 5 of the telescopic sight 1. The light spot which can be produced in this way at the aiming point 7 in the reticle 5 is still small and sharp enough to illuminate this aiming point 7 accurately and, particularly in terms of its extent, remains constant irrespective of the distance between the reticle 5 and the convergent lens 20. The supplementary appliance can thus be used universally even on telescopic sights 1 having different focal lengths. Alternatively, the collimation of the light beams for this purpose can also be achieved by optical means other than a convergent or collimator lens.

FIG. 11 shows, schematically, the beam path from the light-emitting diode 19, via the optical fiber 21 and through the convergent or collimator lens 20. The optical fiber 21 which projects from the light-emitting diode 19 extends, as mentioned, as far as the object-side focal point of the convergent or collimator lens 20, and thus limits the diameter of the light beam emerging from this lens, that is to say it acts like an aperture to produce a light spot which is approximately in the form of a point. To this end, the optical fiber 21 has a diameter which is approximately 9 $\mu$m. The divergent beam 26 which originates from the optical fiber 21 and is directed at the convergent or collimator lens 20 is advantageously once again limited by a further aperture 27 immediately before it arrives at this lens 20. The light beams which pass through the aperture 27 and through the convergent lens 20 leave the latter as a tightly limited light beam composed of parallel light beam elements 28. The aperture 27 prevents disturbing reflections on the edge of the convergent lens 20.

In one specific embodiment, it is possible to use, for example, a microconvergent lens 20 having a diameter of 3 mm and a focal length of f=12–15 mm; the optical fiber 21 has a diameter of approximately 9 $\mu$m, but a diameter of 30 $\mu$m to 70 $\mu$m may also still be acceptable. This projects from the light-emitting diode 19 into the passage 18 as far as the object-side focal point of the convergent lens 20. The overall length 1 of the bush 13 then becomes the sum of the focal length f plus the length a of the optical fiber 21 plus the depth b and c of the two respective recesses 16, 17 which accommodate the light-emitting diode 19 and the microconvergent lens 20 (see FIG. 7). In this example, the external diameter of the bush 13 is 4 mm, and the diameter of the passage 18 is 1 mm.

Handling of the very fine optical fiber 21, with the desired diameter of approximately 9 to 10 $\mu$m and a length of approximately 10 mm, is very difficult during production of the supplementary appliance. As an alternative, it is therefore proposed that the optical fiber 21 be replaced by a further aperture 29 arranged at the object-side focal point of the convergent lens 20, in order to limit the divergent beam originating from the light-emitting diode 19 in the way which is schematically illustrated for the beam path between the light-emitting diode 19 and the convergent or collimator lens 20 in FIG. 12; the light spot is in this case produced by the image of the aperture opening in the reticle 5. The aperture 29 thus achieves the same effect as that with the optical fiber 21 in FIG. 11.

FIG. 13 uses a section view to show one possible practical embodiment of such an arrangement within the bush 13 (see FIG. 7). The illustration shows the bush 13 with the recesses 16, 17, which are connected by the concentric passage 18, at its two ends. The light-emitting diode 19 is arranged centrally in the recess 16, the convergent or collimator lens 20 is inserted into the recess 17 and is seated on a step 30 at the junction between the recess 17 and the passage 18. This step 30 at the same time carries out the function of the aperture 27 in front of the convergent lens 20. The aperture 29 is fitted into a step 31 at the junction between the recess 16 and the passage 18. The aperture 29 preferably has a diameter of 9 to 10 $\mu$m, and the material may be platinum-iridium.

The electrical connections of the light-emitting diode 19 are carried out at the side; this can preferably be done within one of the struts 14, for example the central strut 14", for which purpose this strut, as shown, is designed to be somewhat thicker than the two other struts 14, and can be provided with a groove 25 (in this context, see FIGS. 8 and 9) for accommodating the electrical supply lines. The light-emitting diode 19 can be switched on and off by means of a switch 22 fitted on the outside of the cage 9, at the side, and this switch 22 also preferably allows its light intensity to be varied as required.

In the first embodiment of the supplementary appliance described above, the inner ring 12 is mounted by means of leaf springs 10 which are supported at the side on the housing wall of the cage 9, and which can be moved horizontally for adjustment by means of adjustment screws 11 provided on the sides of the cage. FIG. 14 shows an alternative solution for the mounting and adjustment of the inner ring 12 in the cage 9. FIG. 15 shows the view in the direction of the arrow P in FIG. 14. According to this proposal, the inner ring 12 cannot be moved in a horizontal plane, but is mounted such that it can be tilted in a tumbling manner. For this purpose, a number of helical springs 10', preferably three, are supported on a step 32 in the inner wall of the cage 9 and in holes 33, which are provided for this purpose in the inner ring 12 and are arranged spaced apart uniformly on the circumference of the inner ring 12. The inner ring 12 can be tilted by means of adjusting screws 34, preferably socket-headed screws, which can be adjusted from the outside in a thread within the holes 33, until the light spot produced according to the invention is located accurately at the aiming point 7 of a reticle 5.

The electronics for the illuminated reticle are accommodated in a projection 35 which protrudes at the side of the cage 2 and, as shown in FIGS. 14 and 15, can be operated by means of a toggle switch 36 or, according to a variant shown in FIGS. 16 and 17, by means of a rotary switch 37. Operation by means of a slide switch or by means of push-button switches can likewise be provided.

FIGS. 8, 9 and 10 show embodiments of the supplementary appliance in which the way in which the bush 13 is held is varied. While in the first embodiment described above, the struts 14 which originate from the inner circumference of the inner ring 12 and extend as far as the sleeve 15 which accommodates the bush 13 in the center are at angles of 90° and 180° to one another, the struts 14', 14" in the inner ring 12' shown in FIG. 8 are each arranged with uniform angular separations of 120°. In this case as well, the strut 14" which is vertical in FIG. 8 is designed to be somewhat thicker than the two other struts. This strut has a longitudinal groove 25 (see also FIG. 9) in which the electrical connecting lines of the light-emitting diode can be carried out.

According to FIG. 10, only one strut 14 extends as far as the center of the inner ring 12, where it ends in the sleeve 15 which accommodates the bush 13. The advantage of this embodiment is that light throughput is better, while the embodiments with three struts 14 are more robust and are more resistant to impact.

A further variation option, which is not shown, for the supplementary appliance consists in that the light-emitting diode 19 can be arranged at the side on the annular cage 9 of the appliance, and its light is guided into the passage 18 in the bush 13 and to the microlens 20 using an optical fiber (glass fiber) which can in turn be laid within that strut 14 which is designed to be thicker, or in the longitudinal groove 25 in the thicker strut 14".

As can best be seen in FIGS. 6, 14 and 16, the described supplementary appliance 3 is pushed onto the objective end 2 of the telescopic sight 1 when required and can be fixed firmly, such that it cannot slide, by means of a clamping apparatus 23 which is known per se, is provided on the cage 9 and is guided there in a slot 24 (see FIGS. 3 and 4), using a screw on the circumferential surface of the telescopic sight 1. The inner ring 12, which is supported by springs 10 or 10', is adjusted by means of the adjustment screws 11 or the adjusting screws 34, such that the small light spot which is produced by the microconvergent lens 20 when the light-emitting diode 19 is switched on is located in the reticle 5 or at the aiming point 7 of the crosswires in the telescopic sight 1. A small, sharp light spot is thus produced in the reticle 5, to be precise directly at the aiming point 7, whose size and intensity are equivalent to that in conventional telescopic sights which are available on the market with integrated illuminated reticles, and which allow the hunter to aim at his target even in twilight or in moonlight; there is thus no need to estimate or average the position of the aiming point 7. There is no light scatter to reduce the contrast. In this case, no calibration firing is required for adjustment, and the light point just needs to be made to coincide with the aiming point 7 in the reticle 5, which is simple to do using the adjustment or adjusting screws 11 or 34. The light point is switched on and off by means of a switch 22 (toggle switch or rotary switch 36, 37) fitted at the side, and its light intensity can also preferably be varied.

Since this supplementary appliance is fitted to the objective end 2 of the telescopic sight 1, the distance between the eye and the ocular 4 remains unchanged. The struts 14 which hold the bush 13 do not have any disturbing effect on the user's eye by interrupting the light. The appliance can be fitted to the telescopic sight, and can be removed again, when required with a few, simple actions and without the assistance of any tool. This supplementary appliance can be fitted as a supplementary device to all telescopic sights on the market, irrespective of their magnification and objective diameter. In comparison to an illuminated reticle which is integrated in the telescopic sight, it has the particular advantage that it can optionally be used on different telescopic sights.

What is claimed is:

1. Supplementary appliance for producing an illuminated reticle for telescopic sights, characterized in that an inner ring (12) is mounted such that it can be adjusted centrally in an annular cage (9) which can be pushed onto the objective side (2) of a telescopic sight (1), and the light from a point light source (19) is directed onto a lens (20) which is held on the center axis of the inner ring (12), with the diameter of the light beam which emerges from the light source being limited by optical means (21, 29) at the object-side focal point of the lens (20), and with the light beams which leave the lens (20) being directed onto an aiming point (7) of the reticle (5) of the telescopic sight (1).

2. Supplementary appliance according to claim 1, characterized in that the light source (19) is a light-emitting diode.

3. Supplementary appliance according to claim 1, characterized in that the optical means which limits the diameter of the light beam which emerges from the light source (19) is an optical fiber (21) which projects from the light source and projects as far as the object-side focal point of the lens (20).

4. Supplementary appliance according to claim 1, characterized in that the optical means which limits the diameter of the light beam which emerges from the light source (19) is an aperture (29) which is arranged at the object-side focal point of the lens (20).

5. Supplementary appliance according to claim 1, characterized in that the lens (20) is a convergent or collimator lens, and the light beams (26) which originate from the focal point of the lens (20) and arrive at the lens (20) as divergent beams leave it as parallel light beams (28).

6. Supplementary appliance according to claim 1, characterized in that the lens (20) is a convergent lens whose image-side focal point is located at the aiming point (7) of the reticle (5) of the telescopic sight (1).

7. Supplementary appliance according to claim 1, characterized in that the diameter of the divergent light beam

(26) which arrives at the lens (20) is limited by an aperture (27) arranged in front of the lens (20).

8. Supplementary appliance according to claim 1, characterized in that a bush (13) is held on the center axis of the inner ring (12) by one or more thin struts (14, 14', 14") which originate from the inner circumference of the inner ring (12), in that, at its end facing away from the objective of the telescopic sight (1), this bush (13) has a recess (16) for accommodating the light source (19) and, at its other end, has a recess (17) for accommodating the lens (20), with the two recesses (16, 17) being connected to one another by a central passage (18).

9. Supplementary appliance according to claim 8, characterized in that an aperture (29) is arranged in the bush (13), at the object-side focal point of the lens (20).

10. Supplementary appliance according to claim 9, characterized in that the opening of the aperture (29) has a diameter of approximately 9 µm.

11. Supplementary appliance according to claim 8, characterized in that an optical fiber (21) projects from the light source (19) into the passage (18) in the bush (13), as far as the object-side focal point of the lens (20).

12. Supplementary appliance according to claim 8, characterized in that the optical fiber (21) has an outlet opening with a diameter of approximately 9 µm.

13. Supplementary appliance according to claim 8, characterized in that the overall length (1) of the bush (13) is equal to the sum of the focal length (f) of the lens (20) plus the length (a) of the optical fiber (21) plus the depths (b, c) of the two respective recesses (16, 17) for accommodating the light source (19) and the lens (20).

14. Supplementary appliance according to claim 1, characterized in that the light source (19) is fitted to the side of the cage (9), and its light is carried by an optical fiber to the object-side focal point of the lens (20) which is held by struts (14, 14', 14") which originate from the inner circumference of the inner ring (12).

15. Supplementary appliance according to claim 1, characterized in that struts (14, 14', 14") which originate from the inner circumference of the inner ring (12) end in a sleeve (15) which is located on the center axis of the inner ring (12) and in which the lens (20) is held.

16. Supplementary appliance according to claim 1, characterized in that the lens (20) is held by three struts (14) which originate from the inner circumference of the inner ring (12) and end in a sleeve (15) and are held separated from one another by an angle of 90° or 180°.

17. Supplementary appliance according to claim 1, characterized in that the lens (20) is held by three struts (14', 14") which originate from the inner circumference of the inner ring (12) and end in a sleeve (15) and are held separated from one another by an angle of 120°.

18. Supplementary appliance according to claim 1, characterized in that the lens (20) is held by a single strut (14) which originates from the inner circumference of the inner ring (12) and ends in a sleeve (15) at the center of the inner ring (12).

19. Supplementary appliance according to claim 8, characterized in that the electrical supply lines for the light source (19) are carried out through one of the struts (14, 14").

20. Supplementary appliance according to claim 19, characterized in that one of the struts (14") is designed to be thicker and has a longitudinal groove (25) for accommodating the electrical supply lines for the light source (19).

21. Supplementary appliance according to claim 1, characterized in that the inner ring (12) is mounted in the cage (9) by means of leaf springs (10) which are supported on the inner circumference of the cage (9) and on the outer circumference of the inner ring (12), and its position can be adjusted by means of adjustment screws (11) which pass through the wall of the cage (9).

22. Supplementary appliance according to claim 1, characterized in that the inner ring (12) is mounted in the cage (9) by means of helical springs (10') which are supported at one end on a step (32) in the inner wall of the cage (9) and at the other end in holes (33) which are provided for this purpose in the inner ring (12), and in that the inner ring (12) can be tilted by means of adjusting screws (34) which can be adjusted in the holes (33) from the outside.

23. Supplementary appliance according to claim 1, characterized in that the cage (9) has a clamping apparatus (23) by means of which it can be fixed firmly on the objective side (2) of the telescopic sight (1).

24. Supplementary appliance according to claim 1, characterized in that a switch (22) in the form of a toggle switch (36), a rotary switch (37) or a push-button switch is arranged on the side of the cage (9), in order to switch the light source (19) on and off.

25. Supplementary appliance according to claim 1, characterized in that a combined switch (22) for switching the light source (19) on and off and for varying its light intensity is arranged on the side of the cage (9).

* * * * *